A. A. MORSE.
SAFETY CONTROL DEVICE FOR ELEVATORS.
APPLICATION FILED AUG. 15, 1914.
1,172,549.
Patented Feb. 22, 1916.
2 SHEETS—SHEET 1.
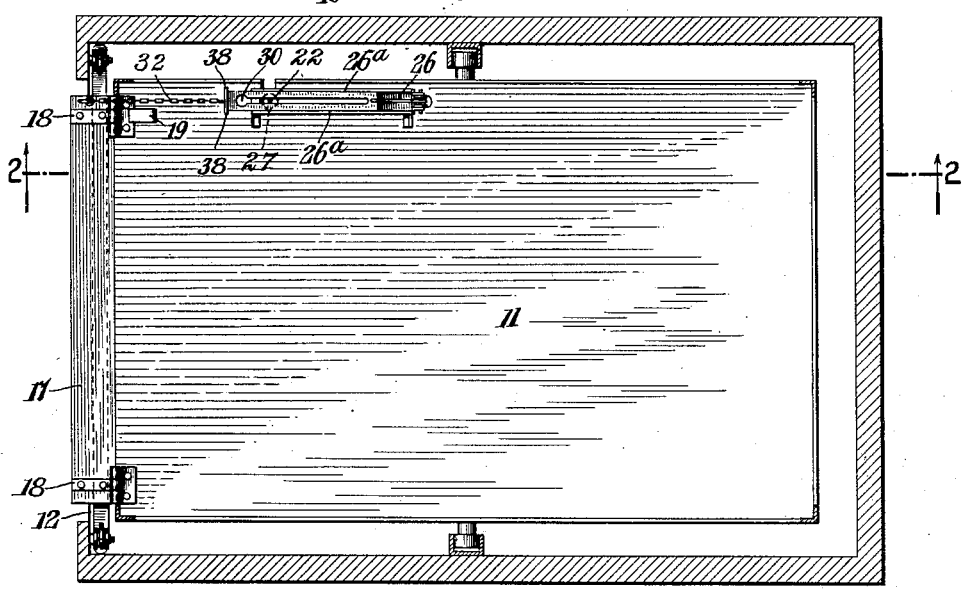
Witnesses:
Edwin H. Dieterich.
A. Ross.
Inventor
ALBERT A. MORSE
By Conrad A. Dieterich
ATTORNEY.

A. A. MORSE.
SAFETY CONTROL DEVICE FOR ELEVATORS.
APPLICATION FILED AUG. 15, 1914.
1,172,549.
Patented Feb. 22, 1916.
2 SHEETS—SHEET 2.
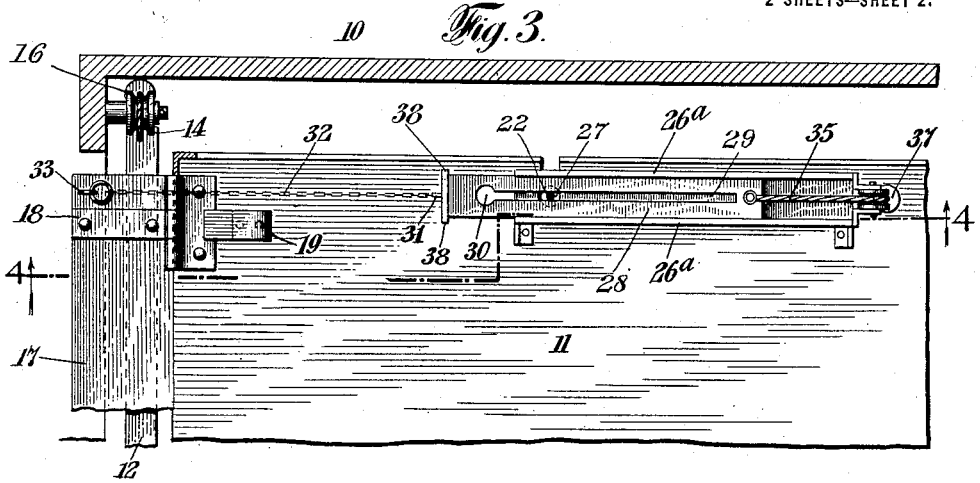
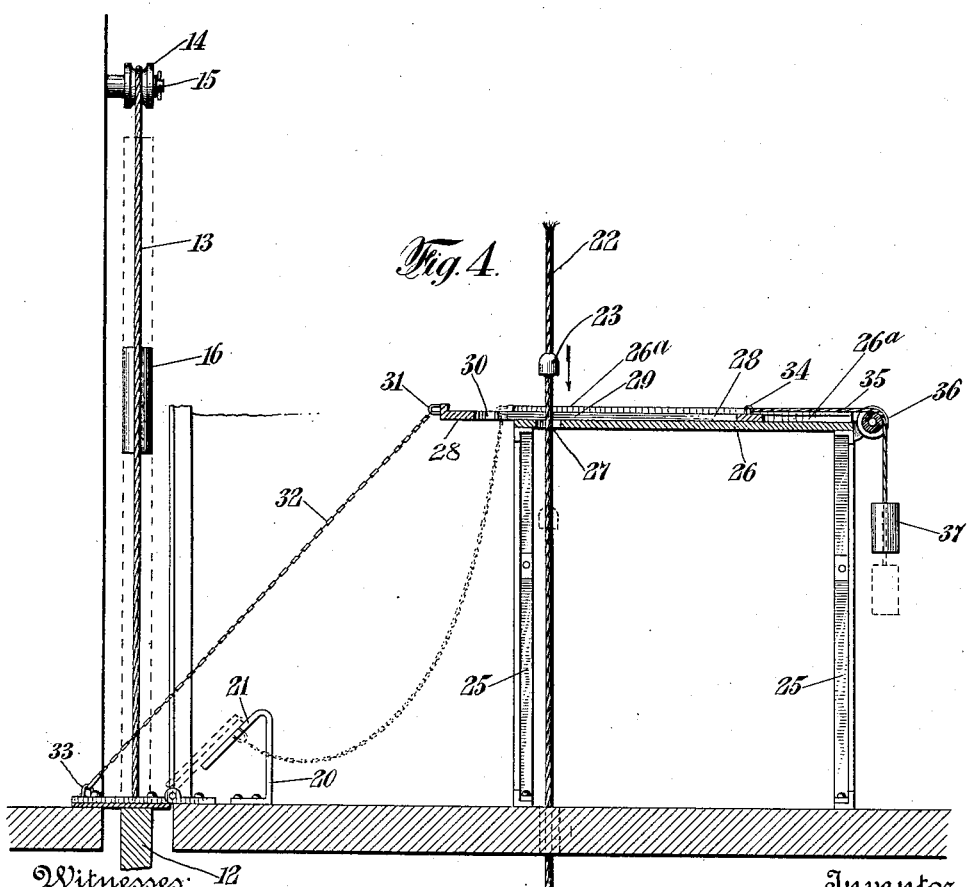
Witnesses:
Edwin F. Dieterich
A. Ross.
Inventor
ALBERT A. MORSE
By Conrad A. Dieterich
his ATTORNEY.

UNITED STATES PATENT OFFICE.

ALBERT A. MORSE, OF NEW YORK, N. Y.

SAFETY CONTROL DEVICE FOR ELEVATORS.

1,172,549.  Specification of Letters Patent.  Patented Feb. 22, 1916.

Application filed August 15, 1914. Serial No. 856,927.

*To all whom it may concern:*

Be it known that I, ALBERT A. MORSE, a citizen of the United States, residing at the city of New York, borough of Manhattan, in the county and State of New York, have invented certain new and useful Improvements in Safety Control Devices for Elevators, of which the following is a full, clear, and exact specification.

My improvement relates to safety devices for elevators, and the same has for its object to provide a simple, efficient and reliable device which will prevent the premature starting of the car when the same is at rest opposite a floor and the gate at such floor open.

Further, said invention has for its object to provide a safety control device for elevators comprising an adjustable member adapted to bridge the space between the edge of the car and the wall of the shaft opposite each floor, and which also serves to actuate a locking mechanism to prevent the actuating of the operating cable when said adjustable member is in its said extended or projected position.

Further, said invention has for its object to provide a safety control device, more particularly designed for use in connection with freight elevators, comprising a locking mechanism consisting of a fixed portion, a movable portion, and an adjustable member which must first be adjusted to a horizontal position to permit of the loading or unloading of freight upon or from the car, and means connecting the movable portion of said locking member with said adjustable member so that, as said adjustable member is moved from inoperative to operative position, it will lock the operating cable against accidental or premature movement.

Further, said invention has for its object to provide a safety control device for elevator cars which will prevent the starting of the car as long as the gate located upon the floor where the elevator has been stopped is open to permit of access to or from the car.

To the attainment of the aforesaid objects and ends, my invention consists in the novel details of construction, and in the combination, connection and arrangement of parts hereinafter more fully described and then pointed out in the claims.

In the accompanying drawings forming part of this specification wherein like numerals of reference indicate like parts, Figure 1 is a plan or top view, partly in section on the line 1—1 of Fig. 2, showing one form of safety control device constructed according to and embodying my said invention; Fig. 2 is a vertical section taken on the line 2—2 of Fig. 1; Fig. 3 is an enlarged detail plan or top view showing a portion of the shaft and car, and the locking mechanism, and Fig. 4 is a side view partly in section on the line 4—4 of Fig. 3 showing the details illustrated in plan at said Fig. 3.

In said drawings 10 designates an elevator shaft of usual construction and 11 the car working therein.

12 denotes a vertically movable gate which in the present instance is shown as suspended from flexible supports 13, 13 passing over pulleys 14, 14 mounted upon short shafts 15, 15 secured upon the inner wall of the shaft. The other ends of said flexible supports 13, 13 are provided with counterweights 16, 16 which serve to restore the gate 12 to its normally raised position.

Along the edge of the car, facing the openings to the shaft at each floor, is arranged a longitudinal plate 17 which is coextensive in width with said car, and is pivotally secured thereto at its opposite ends by hinges 18, 18, and to the rear of said plate adjacent to one of said hinges is secured a stop 19 comprising a vertical portion 20 having its forward end 21 adjusted at an angle of about 45 degrees to said vertical portion 20, and forming a support for said hinged plate 17, when the same is folded inwardly as illustrated at Fig. 4.

22 denotes the operating cable having a series of stops 23 thereon, of which one is arranged upon said operating cable opposite to each floor of the building.

Upon the floor 11 of the car is provided a locking device comprising a pair of vertical supports 25, 25 upon the upper ends of which is secured a rigid horizontal plate 26 having a circular opening 27 therein adjacent to its forward end through which the operating cable 22 passes. The opening 27 is of such diameter that the stop 23 may pass freely through said opening when the car is in motion. Upon said support 26 is mounted a slidable plate 28 having a longitudinal slot 29 therein which terminates at its forward end in a circular opening 30 corresponding in size with the opening 27 provided in the fixed plate 26. The slotted portion 29 of the plate 28 is of such width that the same will readily accommodate the operating cable 22 but will not permit of the passage therethrough of the stop 23 arranged upon said operating cable. The slidable plate 28 is guided in its longitudinal movements between flanges 26ª, 26ª provided upon the opposite longitudinal edges of the plate 26.

At the forward end of the slidable plate 28 is provided an eye 31 to which is secured one end of a chain or other flexible member 32 which has its lower end secured to an eye 33 provided upon the upper surface of the hinged plate 17. The opposite or inner end of the slidable plate 28 is provided with an eye 34 to which is secured one end of a chain or flexible member 35 which passes over a pulley 36 mounted at the inner or rear end of the fixed support plate 26, and to the lower end of said flexible member 25 is secured a counterweight 37 which serves to maintain the movable plate normally retracted with the opening 30 therein in register with the opening 27 in the fixed plate 26. The slidable plate 26 is provided at its forward edge with projecting end portions 38, 38 which are adapted to contact with the forward ends of the flanges 26ª, 26ª of the fixed plate 26, in order to limit the inward or rearward movement of said plate 28 under the influence of the counterweight 37, and maintain the circular openings 27, 30 in due register.

The operation of the device is as follows:—When the car is in motion the hinged plate 17 is folded back to the position indicated in dotted lines, Fig. 4. When in this position the slidable, locking plate 28 will be held in its normal position with the opening 30 therein in register with the opening 27 in the fixed plate 26 by the action of the counterweight 37 which serves to hold said slidable plate 28 to its normal or retracted position. When said plate 28 is thus retracted the operating cable 22 may be actuated, since the stops 23 may now pass freely through the openings 27, 30. When it is desired to stop the car at any given floor, it merely becomes necessary to actuate the operating cable 22, and cause the gate 12 at said floor to be lowered to the position indicated in dotted lines at Fig. 2, in which position the upper edge of the gate will be about flush with the level of the floor and of the car bottom. Hereupon said hinged plate 17 is lowered to assume its horizontal position as indicated and thus serve to bridge the space between the edge of the car and the edge of the shaft at the floor desired, and at the same time serve to hold the gate 12 to its lowered position. As the hinged plate 17 is being adjusted to its horizontal position it will cause the slidable locking plate 28 to be drawn outwardly as indicated at Figs. 3 and 4, particularly, and cause the operating cable 22 to be engaged by the slot 29 of said plate, as clearly illustrated at Figs. 3 and 4. When the plate 28 is thus projected it will be impossible to actuate the operating cable 22 since the stop 23 will contact with the upper surface of the plate 28 and being unable to pass through the slot 29, and to enter the opening 27 in said rigid member 26 the car cannot be started while said hinged plate 17 is in its adjusted horizontal position. When it is desired to set the car in motion again it merely becomes necessary first to adjust the hinged plate 17 to the inclined position as illustrated in dotted lines at Fig. 4. As a result of this adjustment the slidable plate 28 will be retracted by the action of the counterweight 37, and thus bring the opening 30 in said slidable plate in register with the opening 27 in the fixed plate whereupon the operating cable may be drawn downwardly, and the stop 23 permitted to pass therethrough and assume the position indicated in dotted lines at Fig. 4. With the parts thus adjusted the car may be operated and caused to travel up or down in the shaft as desired.

It will, of course, be understood that the inventive idea involved is capable of receiving a variety of mechanical expressions and that the particular expression of the idea herein shown and described is merely used for illustration and that the claims are intended to cover all of the various mechanical embodiments of the idea of which it is capable.

Having thus described my invention, what I claim and desire by Letters Patent is:—

1. In an apparatus of the character described, the combination of an elevator shaft, a car, an operating cable therefor, and stops on said operating cable, with a longitudinal plate pivotally secured along one of its longitudinal edges to one edge of the car floor, means for limiting the inward movement of said longitudinal plate, standards mounted upon said car, a horizontal support secured to said standards having an opening therein adapted to receive the operating cable and the stops thereon, guides on said support, a plate slidably mounted on said support and adapted to work intermediate said guides; said slidable plate having a longitudinal slot therein terminating at one end in an enlarged opening corresponding in size with the opening in said horizontal support, means for maintaining said slidable plate normally retracted with its opening therein in register with the corresponding opening in said support, and a member connecting said longitudinal plate with said slidable plate to advance said slidable plate and cause the same to lock said operating cable in inoperative position when said longitudinal plate is adjusted to horizontal position, substantially as specified.

2. In an apparatus of the character described, the combination of an elevator shaft, a car, an operating cable therefor, and stops on said operating cable, with a longitudinal plate pivotally secured along one of its longitudinal edges to one edge of the car floor, means for limiting the inward movement of said longitudinal plate, standards mounted upon said car, a horizontal support secured to said standards having an opening therein adapted to receive the operating cable and the stops thereon, guides on said support, a plate slidably mounted on said support and adapted to work intermediate said guides; said slidable plate having a longitudinal slot therein terminating at one end in an enlarged opening corresponding in size with the opening in said horizontal support, means for maintaining said slidable plate normally retracted with its opening therein in register with the corresponding opening in said support, and a flexible member connecting the other end of said slidable plate with said pivoted, longitudinal plate whereby to advance said slidable plate and cause the same to engage the stops on said operating cable in inoperative position when said longitudinal plate is adjusted to horizontal position, substantially as specified.

3. In an apparatus of the character described, the combination of an elevator shaft, a car, an operating cable therefor, and a series of stops arranged upon said operating cable corresponding in number to the number of floors, with a longitudinal plate pivotally secured along one of its longitudinal edges to the edge of the car and adapted to be folded to a horizontal position to bridge the space between the edge of said car and the wall of the shaft at each floor, a stop for limiting the inward movement of said plate, a support mounted upon said car, an opening in said support adapted to receive said operating cable and said stops thereon, a plate slidably mounted upon said support having a longitudinal slot therein to admit said operating cable and terminating at one end in an enlarged opening corresponding in size with the opening in said support and adapted to receive the stops on said operating cable, a counterweight, a flexible member secured at one end to said counterweight and at its other end to said slidable plate, means for maintaining said slidable plate normally retracted with the enlarged opening therein in register with the opening in said support, and a flexible member connecting the opposite end on said slidable plate and said pivoted longitudinal plate, whereby to shift said slidable plate as said pivoted, longitudinal plate is folded to its horizontal position, and to render said operating cable inoperative, substantially as specified.

Signed at the city of New York, in the county and State of New York, this 30th day of July, one thousand nine hundred and fourteen.

ALBERT A. MORSE.

Witnesses:
  CONRAD A. DIETERICH,
  LOUIS B. HASBROUCK.

Copies of this patent may be obtained for five cents each, by addressing the "Commissioner of Patents, Washington, D. C."